United States Patent
Kachmar et al.

(10) Patent No.: US 8,224,141 B2
(45) Date of Patent: Jul. 17, 2012

(54) MULTI-JACKETED FIBER OPTIC CABLE

(75) Inventors: Wayne M. Kachmar, North Bennington, VT (US); Thomas G. LeBlanc, Westminster, MA (US); Ronald J. Kleckowski, Manchester Center, VT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 377 days.

(21) Appl. No.: 12/472,544

(22) Filed: May 27, 2009

(65) Prior Publication Data

US 2009/0324181 A1  Dec. 31, 2009

Related U.S. Application Data

(60) Provisional application No. 61/056,394, filed on May 27, 2008, provisional application No. 61/085,319, filed on Jul. 31, 2008, provisional application No. 61/179,604, filed on May 19, 2009.

(51) Int. Cl.
  *G02B 6/44* (2006.01)
(52) U.S. Cl. ............ 385/106; 385/103; 385/107
(58) Field of Classification Search ........... 385/100–114
  See application file for complete search history.

(56) References Cited

U.S. PATENT DOCUMENTS

| | | | |
|---|---|---|---|
| 3,991,014 A | 11/1976 | Kleinschuster | |
| 4,067,852 A | 1/1978 | Calundann | |
| 4,083,829 A | 4/1978 | Calundann et al. | |
| 4,130,545 A | 12/1978 | Calundann | |
| 4,161,470 A | 7/1979 | Calundann | |
| 4,318,842 A | 3/1982 | East et al. | |
| 4,374,608 A | 2/1983 | Anderson | |
| 4,468,364 A | 8/1984 | Ide | |
| 4,515,435 A | 5/1985 | Anderson | |
| 4,659,174 A | 4/1987 | Ditscheid et al. | |
| 4,807,962 A | 2/1989 | Arroyo et al. | |
| 4,815,813 A | 3/1989 | Arroyo et al. | |
| 4,818,060 A | 4/1989 | Arroyo | |

(Continued)

FOREIGN PATENT DOCUMENTS

DE 3914367 A1 * 11/1990

(Continued)

OTHER PUBLICATIONS

ADC Spec Sheet, Fiber Optic Cable, Ruggedized Simplex and Duplex Cables, ADC®, Oct. 2005, 4 pages.

(Continued)

*Primary Examiner* — Daniel Petkovsek
(74) *Attorney, Agent, or Firm* — Merchant & Gould P.C.

(57) ABSTRACT

A fiber optic cable includes an inner jacket and an outer jacket. The inner jacket surrounds an optical fiber and a strength layer positioned between the optical fiber and the inner jacket. The inner jacket includes a liquid crystal polymer within a base polymeric material. The outer jacket defines an elongate transverse cross-sectional profile. A strength member is positioned outside the inner jacket. The outer jacket is removable from the inner jacket such that the fiber optic cable forms a first cable portion that extends from a first end of the fiber optic cable to an intermediate location of the fiber optic cable and a second cable portion that extends from the intermediate location to a second end of the fiber optic cable. The first cable portion is more rugged than the second cable portion.

2 Claims, 10 Drawing Sheets

U.S. PATENT DOCUMENTS

| | | | |
|---|---|---|---|
| 4,844,575 | A | 7/1989 | Kinard et al. |
| 4,895,427 | A | 1/1990 | Kraft |
| 4,909,592 | A | 3/1990 | Arroyo et al. |
| 4,913,517 | A | 4/1990 | Arroyo et al. |
| 5,015,063 | A | 5/1991 | Panuska et al. |
| 5,125,063 | A | 6/1992 | Panuska et al. |
| 5,146,046 | A | 9/1992 | Arroyo et al. |
| 5,157,752 | A | 10/1992 | Greveling et al. |
| 5,214,730 | A | 5/1993 | Nagasawa et al. |
| 5,229,851 | A | 7/1993 | Rahman |
| 5,293,442 | A | 3/1994 | Sayegh |
| 5,345,525 | A | 9/1994 | Holman et al. |
| 5,345,526 | A | 9/1994 | Blew |
| 5,384,880 | A | 1/1995 | Keller et al. |
| 5,557,698 | A | 9/1996 | Gareis et al. |
| 5,627,932 | A | 5/1997 | Kiel et al. |
| 5,737,470 | A | 4/1998 | Nagano et al. |
| 5,809,194 | A | 9/1998 | Lovie |
| 5,838,864 | A | 11/1998 | Patel et al. |
| 5,970,196 | A | 10/1999 | Greveling et al. |
| 5,978,536 | A | 11/1999 | Brandi et al. |
| 6,014,487 | A | 1/2000 | Field et al. |
| 6,052,502 | A | 4/2000 | Coleman et al. |
| 6,088,499 | A | 7/2000 | Newton et al. |
| 6,249,628 | B1 | 6/2001 | Rutterman et al. |
| 6,256,438 | B1 | 7/2001 | Gimblet |
| 6,321,012 | B1 | 11/2001 | Shen |
| 6,356,690 | B1 | 3/2002 | McAlpine et al. |
| 6,500,541 | B1 | 12/2002 | Schoeck, Jr. et al. |
| 6,633,709 | B2 | 10/2003 | VanVickle et al. |
| 6,701,047 | B1 | 3/2004 | Rutterman et al. |
| 6,807,347 | B2 | 10/2004 | McAlpine et al. |
| 6,898,354 | B2 | 5/2005 | Kim et al. |
| 6,901,191 | B2 | 5/2005 | Hurley et al. |
| 6,937,801 | B2 | 8/2005 | McAlpine et al. |
| 7,010,201 | B2 * | 3/2006 | Risch .......................... 385/100 |
| 7,113,680 | B2 | 9/2006 | Hurley et al. |
| 7,180,000 | B2 | 2/2007 | Hager et al. |
| 7,349,642 | B2 | 3/2008 | Tatematsu et al. |
| 7,379,642 | B2 | 5/2008 | Kachmar |
| 7,491,778 | B2 | 2/2009 | Flautt et al. |
| 7,570,853 | B2 * | 8/2009 | Mahapatra et al. ........... 385/102 |
| 7,787,727 | B2 | 8/2010 | Bringuier et al. |
| 2002/0146563 | A1 * | 10/2002 | Risch ............................ 428/375 |
| 2003/0118296 | A1 * | 6/2003 | Smith ........................... 385/102 |
| 2006/0159407 | A1 * | 7/2006 | Kachmar ...................... 385/102 |
| 2006/0280413 | A1 | 12/2006 | Paschal et al. |
| 2006/0291787 | A1 * | 12/2006 | Seddon ......................... 385/113 |
| 2007/0127878 | A1 | 6/2007 | de Montmorillon et al. |
| 2007/0280615 | A1 | 12/2007 | de Montmorillon et al. |
| 2009/0317039 | A1 | 12/2009 | Blazer et al. |

FOREIGN PATENT DOCUMENTS

| | | | |
|---|---|---|---|
| GB | 1 483 845 | | 8/1977 |
| GB | 2 096 343 A | | 10/1982 |
| GB | 2 296 575 A | | 7/1996 |
| JP | 62173410 A | * | 7/1987 |
| JP | 62220912 A | * | 9/1987 |

OTHER PUBLICATIONS

ADC Spec Sheet, Fiber Optic Cable, Tactical Cables, ADC®, Oct. 2005, 4 pages.

Krone Optical Systems, Inc. Krone Technical Data, FiberOptic Cabling Solutions, Ruggedized High Density Cables, 2 pages, Oct. 23, 2003.

Northern Lights Cable, a prestolite wire company, 6$^{th}$ edition, Ruggedized High Density Cables, 3 pages. Publically known at least as early as least May 26, 2008.

Superior Essex, FTTP Tight Buffered Indoor/Outdoor Drop, Series W7, RoHS, Product Bulletin, OSP Fiber Products, Nov. 2008, 2 pages.

www.adc.com, Ruggedized High Density Cables, 1 page, Publically known at least as early as May 26, 2008.

Description of Fiber Optic Cable—LCF Microcable: Plenum, 6 pages (Aug. 2005).

Fiber Optic Cable LCF Microcable: Plenum, *ADC Telecommunications, Inc.*, 4 pages (Aug. 2005).

International Search Report and Written Opinion mailed Jan. 7, 2010.

* cited by examiner

MULTI-JACKETED FIBER OPTIC CABLE

CROSS-REFERENCE TO RELATED APPLICATIONS

The present application claims priority to U.S. Provisional Patent Application Ser. No. 61/056,394 entitled "Multi-jacketed Fiber Optic Cable" and filed on May 27, 2008, U.S. Provisional Patent Application Ser. No. 61/085,319 entitled "Multi-jacketed Fiber Optic Cable" and filed on Jul. 31, 2008 and U.S. Provisional Patent Application Ser. No. 61/179,604 entitled "Multi-jacketed Fiber Optic Cable" and filed on May 19, 2009. The above disclosures are hereby incorporated by reference in their entirety.

BACKGROUND

As fiber to the home is extended into more and different living units, the cables used must provide more and more resistance to difficult installation requirements. In many cases, methods of installing cables made of copper are employed for fiber optic cables. The installation conditions and bend and impact rules are different as copper is a malleable metal and conducts electricity regardless of physical shape and does not degrade significantly under poor installation conditions. Optical fiber cables of small diameter must be protected against many new forms of installation abuse that do not affect copper drop cables. These include sensitivity to sharp bends and resistance to impacts such as flat staples installed along structural building components such as beams and trim boards.

SUMMARY

An aspect of the present disclosure relates to a fiber optic cable assembly including an inner cable assembly. The inner cable assembly includes an optical fiber, a first strength layer surrounding the optical fiber and a first jacket surrounding the strength layer. A second strength layer surrounds the inner cable assembly. The second strength layer includes strength members that are contra-helically served. The strength members are unbraided. A second jacket surrounds the second strength layer.

Another aspect of the present disclosure relates to a cable assembly. The cable assembly includes a fiber optic cable assembly having an inner cable assembly. The inner cable assembly includes an optical fiber, a first strength layer surrounding the optical fiber and a first jacket surrounding the strength layer. A second strength layer surrounds the inner cable assembly. The second strength layer includes a first set of strength members helically wrapped around the first jacket and a second set of strength members reverse helically wrapped around the first jacket. The first and second sets of strength members are unbraided. A second jacket surrounds the second strength layer. The cable assembly further includes a fiber optic connector engaged with an end of the fiber optic cable assembly.

Another aspect of the present disclosure relates to a cable assembly. The cable assembly includes a fiber optic cable assembly having an inner cable assembly. The inner cable assembly includes an optical fiber, a first strength layer surrounding the optical fiber and a first jacket surrounding the strength layer. A second strength layer surrounds the inner cable assembly. The second strength layer includes a first set of strength members helically wrapped around the first jacket and a second set of strength members reverse helically wrapped around the first jacket. The first and second sets of strength members are unbraided. A second jacket surrounds the second strength layer. The second jacket includes a base material having a plurality of reinforcing members embedded in the base material. The cable assembly further includes a fiber optic connector engaged with an end of the fiber optic cable assembly.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
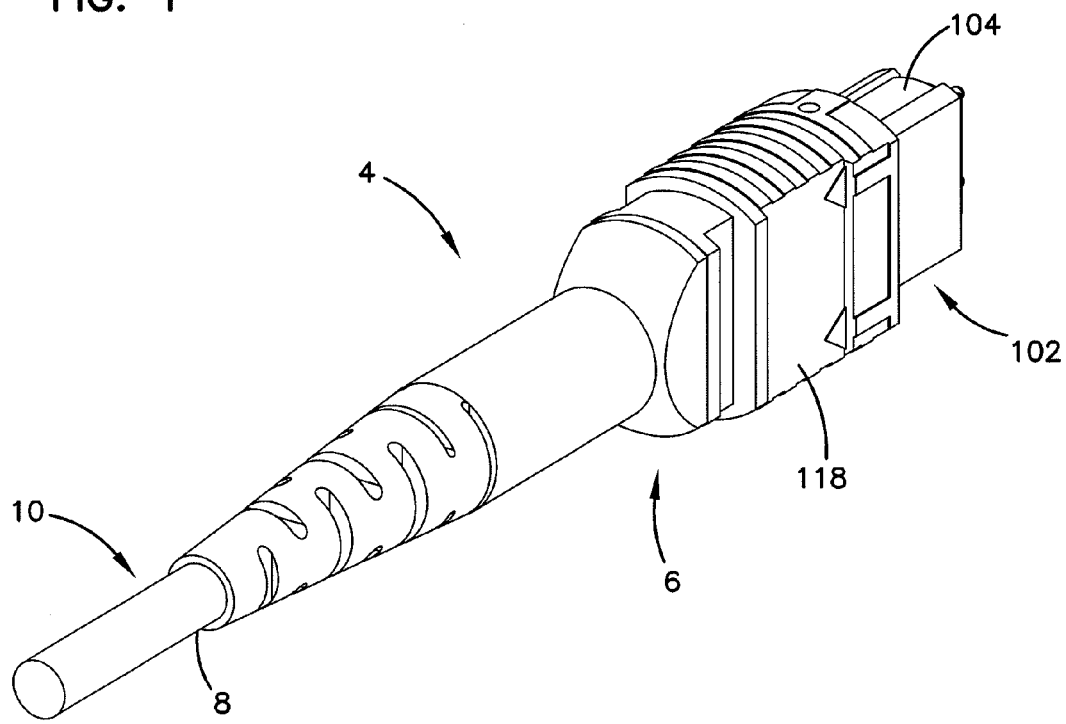
FIG. 1 is a perspective view of a cable assembly having exemplary features of aspects in accordance with the principles of the present disclosure.
Figure 2:
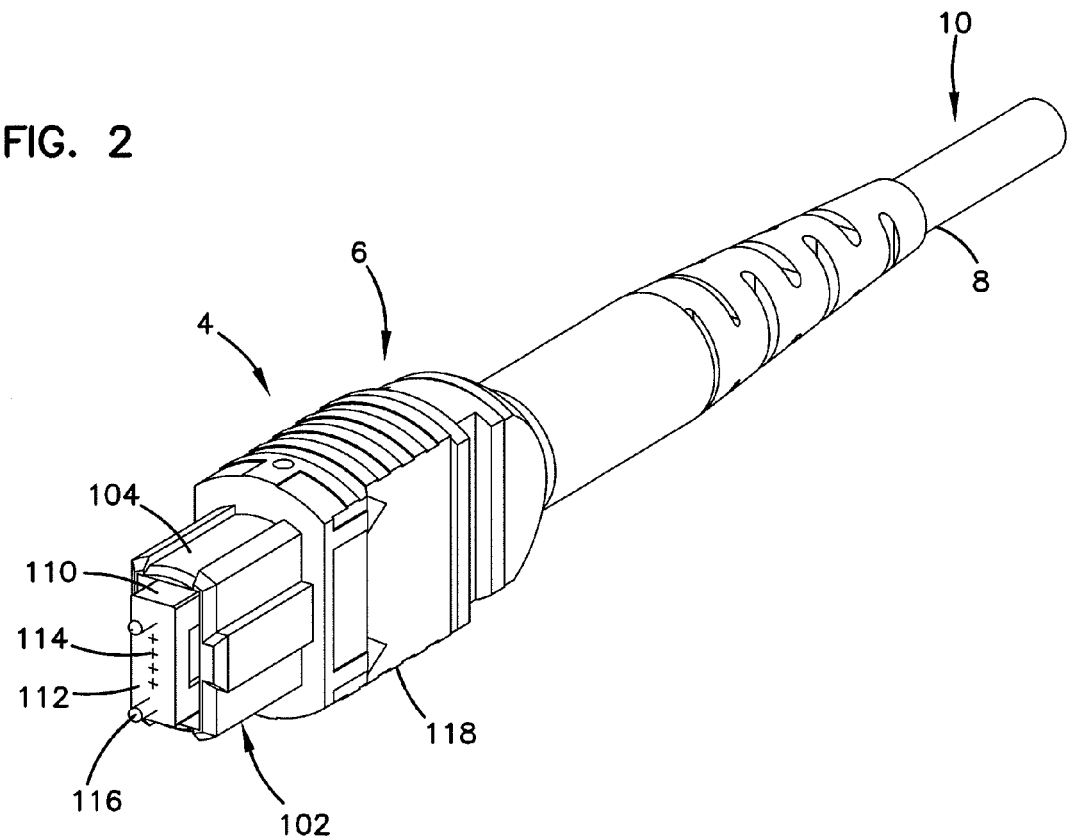
FIG. 2 is an alternate perspective view of the cable assembly of FIG. 1.

Referring now to FIGS. 1 and 2, a cable assembly, generally designated 4, is shown. In the subject embodiment, the cable assembly 4 includes a connector 6 engaged to an end 8 of a fiber optic cable assembly, generally designated 10.

Figure 3:
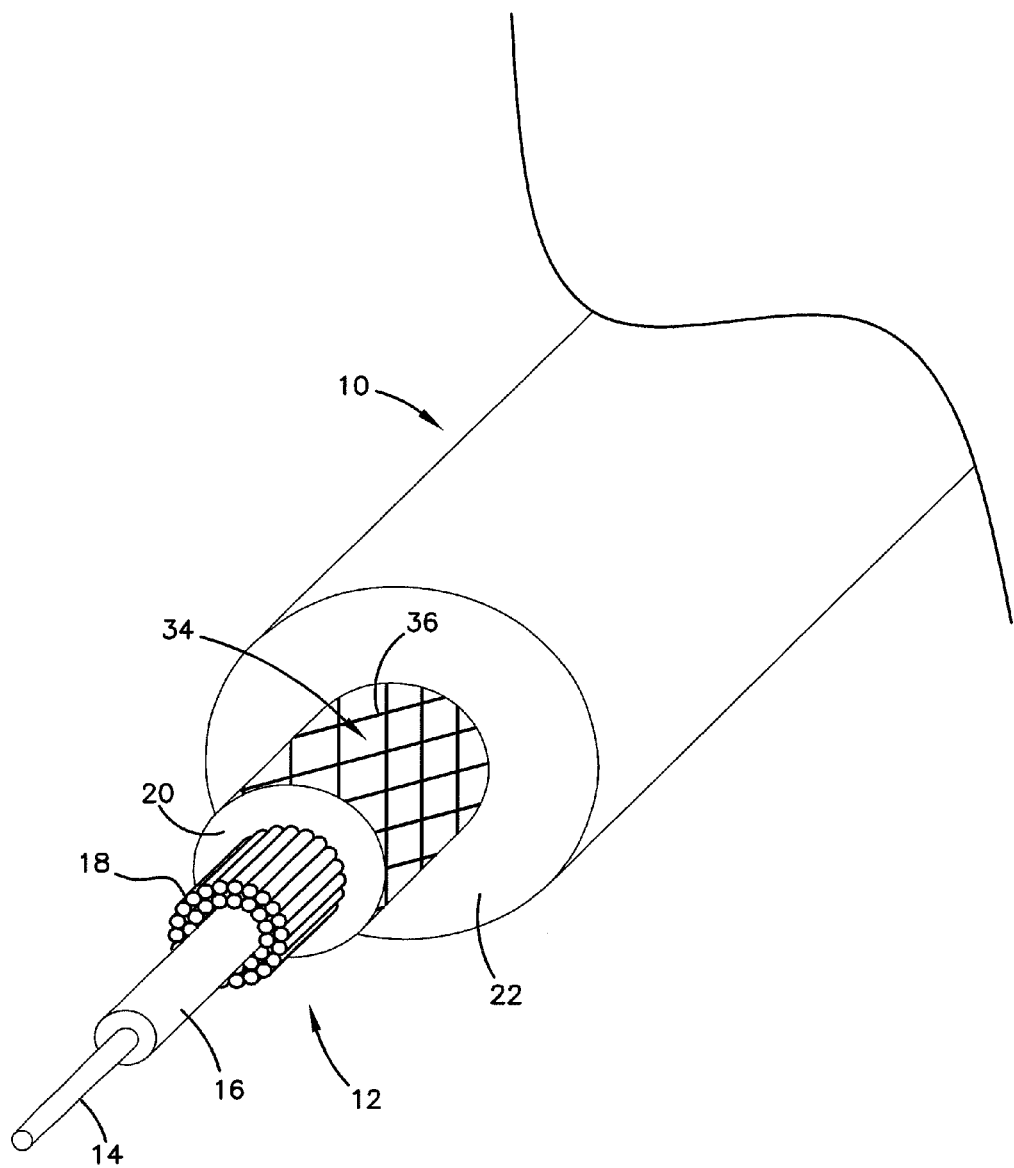
FIG. 3 is a perspective view of a fiber optic cable assembly suitable for use in the cable assembly of FIG. 1.

Referring now to FIG. 3, the fiber optic cable assembly 10 includes an inner cable assembly, generally designated 12. The inner cable assembly 12 includes at least one optical fiber, generally designated 14, a buffer layer 16, a first strength layer 18, and a first jacket 20. The fiber optic cable assembly 10 further includes a second jacket 22 disposed about the inner cable assembly 12.

In the subject embodiment, the second jacket 22 of the fiber optic cable assembly 10 includes an outer diameter that can be sized to prevent or reduce the risk of damage (e.g., crushing, bending, etc.) to the optical fiber 14 during installation. However, as a cable configuration having a larger outer diameter can be difficult to install/route within a compact end location, such as a fiber optic enclosure, at least a portion of the second jacket 22 can be removed to expose the inner cable assembly 12 having a more compact cable configuration.

Figure 4:
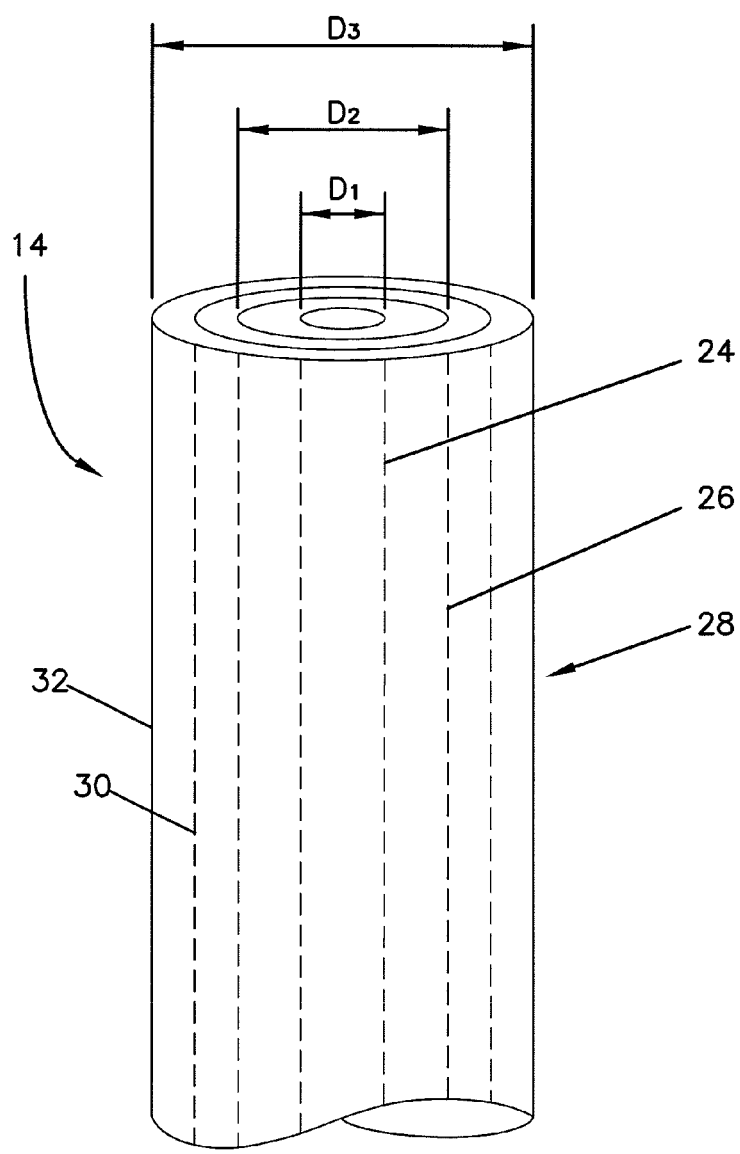
FIG. 4 is perspective view of an optical fiber suitable for use in the fiber optic cable assembly of FIG. 3.

Referring now to FIG. 4, the optical fiber 14 of the inner cable assembly 12 is shown. The optical fiber 14 includes a core 24. The core 24 is made of a glass material, such as a silica-based material, having a first index of refraction. In the subject embodiment, the core 24 has an outer diameter $D_1$ of less than or equal to about 10 µm.

The core 24 of the optical fiber 14 is surrounded by a cladding 26 that is also made of a glass material, such as a silica based-material. The cladding 26 defines a second index of refraction that is less than the first index of refraction defined by the core 24. This difference between the first index of refraction of the core 24 and the second index of refraction of the cladding 26 allows an optical signal that is transmitted through the optical fiber 14 to be confined to the core 24. In the subject embodiment, the cladding 26 has an outer diameter $D_2$ of less than or equal to about 125 µm.

A coating, generally designated 28, surrounds the cladding 26. The coating 28 includes an inner layer 30 and an outer layer 32. In the subject embodiment, the inner layer 30 of the coating 28 is immediately adjacent to the cladding 26 such that the inner layer 30 surrounds the cladding 26. The inner layer 30 is a polymeric material (e.g., polyvinyl chloride, polyethylenes, polyurethanes, polypropylenes, polyvinylidene fluorides, ethylene vinyl acetate, nylon, polyester, or other materials) having a low modulus of elasticity. The low modulus of elasticity of the inner layer 30 functions to protect the optical fiber 14 from microbending.

The outer layer 32 of the coating 28 is a polymeric material having a higher modulus of elasticity than the inner layer 30. In the subject embodiment, the outer layer 32 of the coating 28 is immediately adjacent to the inner layer 30 such that the outer layer 32 surrounds the inner layer 30. The higher modulus of elasticity of the outer layer 32 functions to mechanically protect and retain the shape of optical fiber 14 during handling. In the subject embodiment, the outer layer 32 defines an outer diameter $D_3$ of less than or equal to about 250 µm. In another embodiment, the outer diameter $D_3$ of the outer layer 32 is in the range of about 242 µm to about 245 µm.

In one embodiment, the optical fiber 14 is manufactured to reduce the sensitivity of the optical fiber 14 to micro or macro-bending (hereinafter referred to as "bend insensitive"). Exemplary bend insensitive optical fibers 14 have been described in U.S. Pat. Application Publication Nos. 2007/0127878 and 2007/0280615, now U.S. Pat. No. 7,623,747 and 7,587,111, respectively, are hereby incorporated by reference in their entirety. An exemplary bend insensitive optical fiber 14 suitable for use in the inner cable assembly 12 of the fiber optic cable assembly 10 of the present disclosure is commercially available from Draka Comteq under the name BendBright XS.

Referring again to FIG. 3, the buffer layer 16 is depicted as a tight layer that surrounds the optical fiber 14. It will be understood, however, that the scope of the present disclosure is not limited to the buffer layer 16 being a tight layer.

The buffer layer 16 can have any number of conventionally known constructions. For example, the buffer layer 16 can be made of a polymeric material such as polyvinyl chloride (PVC). Other polymeric materials (e.g., polyethylenes, polyurethanes, polypropylenes, polyvinylidene fluorides, ethylene vinyl acetate, nylon, polyester, or other materials) may also be used. In the subject embodiment, the buffer layer 16 defines an outer diameter that is less than or equal to about 1 mm. In another embodiment, the outer diameter of the buffer layer 16 is less than or equal to about 900 µm.

The first strength layer 18 is adapted to inhibit axial tensile loading from being applied to the optical fiber 14. In the subject embodiment, the first strength layer 18 extends the length of the fiber optic cable assembly 10 and is disposed in a generally longitudinal direction along the fiber optic cable assembly 10 between the buffer layer 16 and the first jacket 20. In certain embodiment, the first strength layer 18 can include yarns, fibers, threads, tapes, films, epoxies, filaments or other structures. In a preferred embodiment, the first strength layer 18 includes a plurality of aramid yarns (e.g., KEVLAR® yarns).

In one embodiment, the plurality of aramid yarns includes an absorbent coating. When the absorbent coating is in contact with non-gaseous fluid (e.g., water), the absorbent coating absorbs the fluid. As the absorbent coating absorbs the fluid, outer diameters of the plurality of aramid yarns with the absorbent coating increase. This increase in the outer diameters of the plurality of aramid yarns blocks the axial and radial flow of non-gaseous fluid in the fiber optic cable assembly 10.

The first jacket 20 surrounds the first strength layer 18. In one embodiment, the first jacket 20 includes an outer diameter that is less than or equal to about 18 mm. In the subject embodiment, the first jacket 20 includes an outer diameter that is less than or equal to about 4 mm. In another embodiment, the outer diameter of the first jacket 20 is less than or equal to about 3.5 mm. In another embodiment, the outer diameter of the first jacket 20 is less than or equal to about 3 mm.

In the subject embodiment, the first jacket 20 includes a base material. In one embodiment, the base material is a polymer material such as a flexible chain polymer (i.e., one in which successive units of the polymer chain are free to rotate with respect to one another, so that the polymer chain can assume a random shape). Example base materials include conventional thermoplastic polymers such as polyethylene, polypropylene, ethylene-propylene, copolymers, polystyrene, and styrene copolymers, polyvinyl chloride, polyamide (nylon), polyesters such as polyethylene terephthalate, polyetheretherketone, polyphenylene sulfide, polyetherimide, polybutylene terephthalate, low smoke zero halogens polyolefins and polycarbonate, as well as other thermoplastic materials. Additives may also be added to the material. Example additives include pigments, fillers, coupling agents, flame retardants, lubricants, plasticizers, ultraviolet stabilizers or other additives. The base material can also include combinations of the above materials as well as combinations of other materials.

The second jacket 22 surrounds the first jacket 20. In the subject embodiment, the second jacket 22 includes an outer diameter that is in the range of about 900 µm to about 20 mm. In another embodiment, the second jacket 22 includes an outer diameter that is less than or equal to about 6 mm. In another embodiment, the outer diameter of the second jacket 22 is about 5.5 mm. In another embodiment, the outer diameter of the second jacket 22 is about 5 mm. In another embodiment, the outer diameter of the second jacket 22 is about 3.6 mm. In another embodiment, the outer diameter of the second jacket 22 is about 3 mm.

In the subject embodiment, the second jacket 22 includes a polymer material such as a flexible chain polymer. Example polymer materials suitable for use for the second jacket 22 include conventional thermoplastic polymers such as polyethylene, polypropylene, ethylene-propylene, copolymers, polystyrene, and styrene copolymers, polyvinyl chloride, polyamide (nylon), polyesters such as polyethylene terephthalate, polyetheretherketone, polyphenylene sulfide, polyetherimide, polybutylene terephthalate, low smoke zero halogens polyolefins and polycarbonate, as well as other thermoplastic materials. Additives may also be added to the material. Example additives include pigments, fillers, coupling agents, flame retardants, lubricants, plasticizers, ultraviolet stabilizers or other additives. The base material can also include combinations of the above materials as well as combinations of other materials. In one embodiment, the material of the second jacket 22 is the same as the material of the first jacket 20. In another embodiment, the material of the second jacket 22 is different than the material of the first jacket 20.

In one embodiment, the first and/or second jacket 20, 22 has a structure that is adapted to resist post-extrusion shrinkage. For example, the first and/or second jacket 20, 22 may include a plurality of reinforcing materials embedded within the polymer material. An example of reinforcing materials embedded in the outer jacket of a fiber optic cable has been described in U.S. Pat. No. 7,379,642, the disclosure of which is hereby incorporated by reference in its entirety.

In one embodiment, the first and/or second jacket 20, 22 includes a plurality of discrete reinforcing members (e.g., rods, tendrils, extensions, fibers, etc.) embedded within the base material. In one embodiment, the reinforcing members are made from a material that can be softened and reshaped in the extrusion process. In a preferred embodiment, the reinforcing members include liquid crystal polymers. Example liquid crystal polymers are described in U.S. Pat. Nos. 3,991,014; 4,067,852; 4,083,829; 4,130,545; 4,161,470; 4,318,842; and 4,468,364, which are hereby incorporated by reference in their entireties. Liquid crystal polymers are polymers that are anisotropic and highly oriented, even in a softened or liquid phase.

The reinforcing members are preferably elongated and have lengths that are aligned generally parallel to a longitudinal axis of the fiber optic cable assembly 10. Each of the reinforcing members preferably does not extend the entire length of the fiber optic cable assembly 10. Instead, each of the reinforcing members preferably coincides with or extends along only a relatively short segment of the total length of the fiber optic cable assembly 10. For example, in one embodiment, at least some of the reinforcing members have lengths in the range of 0.2 mm-100 mm. In another embodiment, at least some of the reinforcing members have lengths in the range of 5-60 mm. In still another embodiment, at least some of the reinforcing members have lengths in the range of about 10-40 mm. In certain embodiments, a majority of the reinforcing members provided within the base material can be within the size ranges provided above, or within other size ranges. Additionally, most of the reinforcing members are preferably discrete or separate from one another. For example, many of the reinforcing members are preferably separated or isolated from one another by portions of the base material.

To further promote flexibility, the concentration of the reinforcing members is relatively small as compared to the base material. For example, in one embodiment, the reinforcing material constitutes less than 2% of the total weight of the first and/or second jackets 20, 22. In another embodiment, the reinforcing material constitutes less than 1.5% of the total weight of the first and/or second jackets 20, 22. In still another embodiment, the reinforcing material constitutes less than or equal to 1.25% of the total weight of the first and/or second jackets 20, 22. In a further embodiment, the reinforcing material constitutes less than or equal to 1.0% of the total weight of the first and/or second jackets 20, 22. While preferred embodiments use less than 2% of the reinforcing material by weight, other embodiments within the scope of the present invention can use more than 2% by weight of the reinforcing material.

Figure 5:
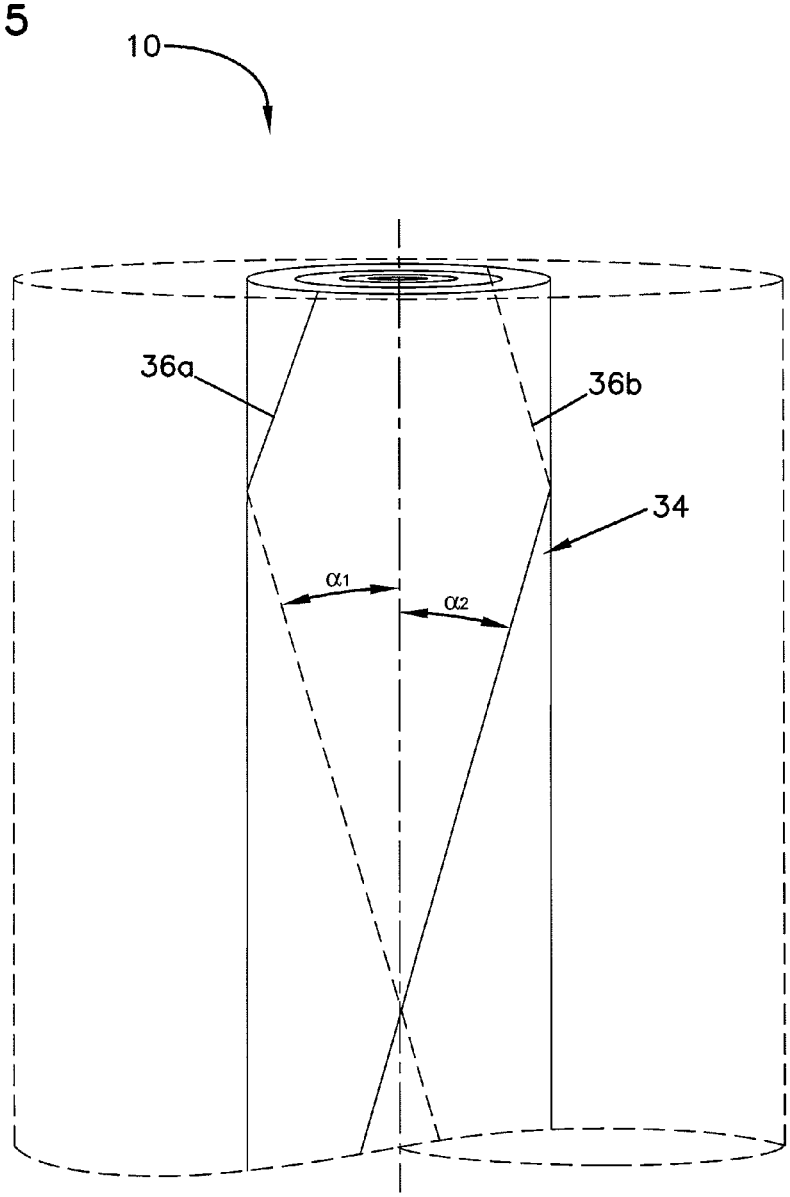
FIG. 5 is a perspective view of a second strength layer suitable for use in the fiber optic cable assembly of FIG. 3.

Referring now to FIGS. 3 and 5, in the subject embodiment, a second strength layer 34 is disposed between the second jacket 22 and the first jacket 20. In one embodiment, the strength layer 34 is bonded to the first jacket 20. In another embodiment, the strength layer 34 is bonded to the second jacket 22. In another embodiment, the strength layer 34 is bonded to the first and second jackets 20, 22.

The second strength layer 34 includes a plurality of strength members 36. In the depicted embodiment of FIG. 5, only two strength members 36 are shown for ease of illustration purposes only.

The strength members 36 are disposed in two sets about the first jacket 20. In the subject embodiment, the strength members 36 include a first set of strength members 36a and a second set of strength members 36b. The second set of strength members 36b is disposed over the first set of strength members 36a such that the first and second sets of strength members 36a, 36b are unbraided or nonwoven.

In the subject embodiment, the first and second sets of strength members 36a, 36b are contra-helically served. For example, in the depicted embodiment of FIG. 5, the first set of strength members 36a is disposed about the first jacket 20 in a generally right-handed helical configuration while the second set of strength members 36b is disposed over the first set of strength members 36a in a generally left-handed helical configuration. The first and second sets of strength members 36a, 36b are disposed at angles $\alpha_1$, $\alpha_2$ from a longitudinal line 37. In one embodiment, the angles $\alpha_1$, $\alpha_2$ are equal but opposite. In another embodiment, the angles $\alpha_1$, $\alpha_2$ are in the range of about 0.1 degrees to about 20 degrees. In another embodiment, the angles $\alpha_1$, $\alpha_2$ are in the range of about 5 degrees to about 20 degrees. In another embodiment, the angles $\alpha_1$, $\alpha_2$ are in the range of about 0.1 degrees to about 15 degrees. In another embodiment, the angles $\alpha_1$, $\alpha_2$ are in a range of about 1 degree to about 15 degrees. In another embodiment, the angles $\alpha_1$, $\alpha_2$ are in the range of about 5 degrees to about 15 degrees. In another embodiment, the angles $\alpha_1$, $\alpha_2$ are in a range of about 0.1 degrees to about 5 degrees. In another embodiment, the angles $\alpha_1$, $\alpha_2$ are in a range of about 0.1 degrees to about 1 degree. This contra-helical orientation of the first and second sets of strength members 36a, 36b protects the fiber optic cable assembly 10 from twisting as the fiber optic cable assembly 10 is axially pulled by a cable puller.

In the subject embodiment, each of the strength members 36 has a lay length in a range of about 3 inches to about 18 inches. The lay length is the axial distance in which each of the strength members 36 wraps 360° around the first jacket 20.

The first and second sets of strength members 36 define a plurality of openings 38. In the subject embodiment, the openings 38 are generally diamond shaped. In one embodiment, an outwardly facing surface of the first jacket 20 bonds to an inner surface of the second jacket 22 through the plurality of openings 38 in the second strength layer 34.

In one embodiment, the strength members 36 in the second strength layer 34 are strands of aramid yarn. In another embodiment, the strength members 36 are ribbonized fiberglass. In one embodiment, there are one to ten strength members 36 in the first set of strength members 36a and one to ten strength members 36 in the second set of strength members 36b. In another embodiment, there are one to eight strength members 36 in the first set of strength members 36a and one to eight strength members 36 in the second set of strength members 36b. In another embodiment, there are four strength members 36 in the first set of strength members 36a and four strength members 36 in the second set of strength members 36b.

Figure 6:
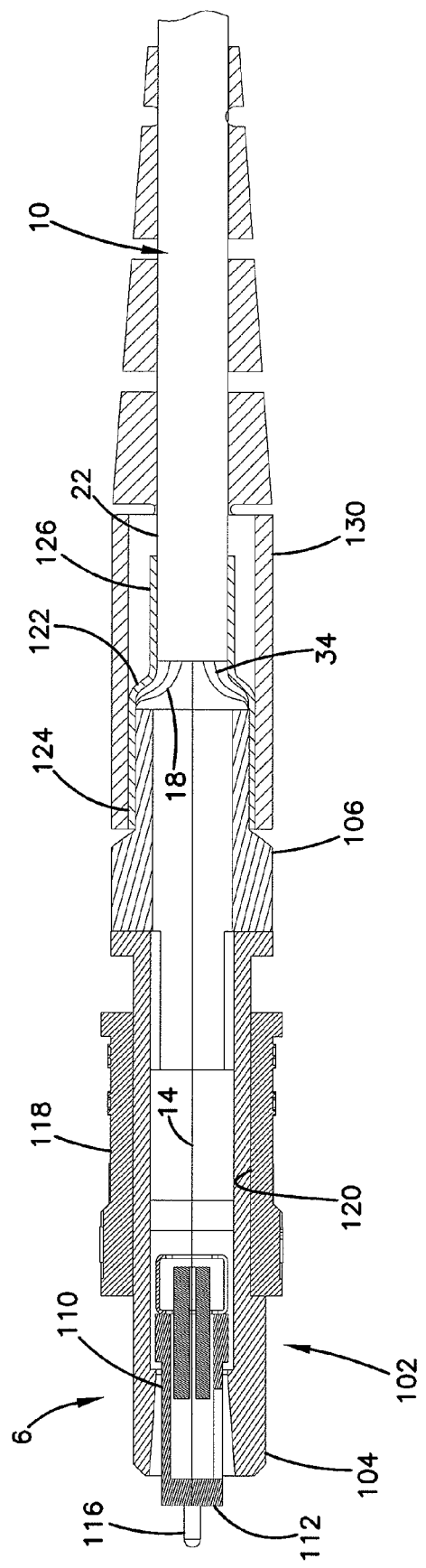
FIG. 6 is a cross-sectional view a fiber optic connector suitable for use with the cable assembly of FIG. 1.

Referring now to FIGS. 1, 2 and 6, the connector 6 is shown. In the subject embodiment, the connector 6 is a multi-fiber connector. An exemplary multi-fiber connector suitable for use with the cable assembly 4 is disclosed in U.S. Pat. No. 5,214,730, the disclosure of which is hereby incorporated by reference in its entirety. Exemplary multi-fiber connectors suitable for use with the cable assembly 4 are available from US Conec Ltd. of Hickory, N.C., USA as part numbers C10821, C10822, C8190, and C10823. Fiber optic connectors related to part numbers C10821, C10822, C8190, and C10823 are known as MTP® connectors.

While the connector 6 is shown as a multi-fiber connector, it will be understood that the scope of the present disclosure is not limited to the connector 6 being of a multi-fiber type (e.g., MT, MTP, MPO, etc.) as the connector 6 could alternatively be of the single fiber type (e.g., SC, ST, LC, LX-5, etc.).

In the depicted embodiment of FIGS. 1, 2 and 6, the connector 6 includes a body 102 having a first axial end 104 and an oppositely disposed second axial end 106. The body 102 defines a cavity 108 that extends through the first and second axial ends 104, 106. The first axial end 104 is adapted for optical connection with a mating connector. The second axial end 106 is adapted for engagement with the fiber optic cable assembly 10.

The connector 6 further includes a ferrule 110. The ferrule 110 is disposed in the cavity 108 at the first axial end 104 of the body 102. The ferrule 110 is adapted to receive the optical fiber 14 of the fiber optic cable assembly 10. The ferrule 110 includes an end 112. In the subject embodiment, the end 112 is generally rectangular in shape. The end 112 defines a plurality of termination locations 114 (shown schematically in FIG. 2 as an "X"). In one embodiment, the end 112 defines twelve termination locations 114. In another embodiment, the end 112 defines twenty-four termination locations 114.

Each of the termination locations 114 is adapted to receive one of the optical fibers 14 of the fiber optic cable assembly 10. In the subject embodiment the termination locations 114 are disposed in a single row on the end 112 of the ferrule 110 of the connector 6.

The ferrule 110 further includes an alignment member 116. In the subject embodiment, one alignment member 116 is disposed on each side of the end 112 of the ferrule 110. In the subject embodiment, the alignment member 116 is an alignment pin. In another embodiment, the alignment member 116 is an alignment hole that is adapted to receive an alignment pin of a mating connector.

The connector 6 includes a release sleeve 118. The release sleeve 118 includes a bore 120 that extends through the release sleeve 118. The bore 120 of the release sleeve 118 is adapted to receive the body 102 of the connector 6. The release sleeve 118 is disposed between the first and second axial ends 104, 106 of the body 102. The release sleeve 118 is moveable between a latched position, in which the connector 6 is engaged to a fiber optic adapter, and a release position, in which the connector 6 is released from engagement with the fiber optic adapter. In one embodiment, a spring biases the release sleeve 118 to the latched position.

Referring now to FIG. 6, the second axial end 106 of the body 102 is adapted for engagement with the fiber optic cable assembly 10. At least one of the first and second strength layers 18, 34 is engaged with the second axial end 106 of the body 102. In the subject embodiment, the second strength layer 34 is engaged with the second axial end 106 of the body 102.

In one embodiment, the second strength layer 34 is exposed by removing or stripping a portion of the second jacket 22. The second strength layer 34 is then positioned around the second axial end 106 of the body 102. A crimping tube 122 having a first end portion 124 and an opposite second end portion 126 is then disposed over the second axial end 106 of the body 102 such that the first end portion 124 is disposed over the second axial end 106 of the body 102 and the second strength layer 34 and the second end portion 126 is disposed over the second jacket 22. The crimping tube 122 is then crimped such that the first end portion 124 crimps the second strength layer 34 to the second axial end 106 of the body 102 while the second end portion 126 is crimped to the second jacket 22.

In the subject embodiment, a strain relief boot 130 is disposed over the crimping tube 122. The strain relief boot 130 is adapted to protect the engagement between the fiber optic cable assembly 10 and the connector 6. In one embodiment, the strain relief boot 130 is adapted to provide bend radius protection to the fiber optic cable assembly 10.

As the outer diameter of the second jacket 22 is larger than the outer diameter of the first jacket 20, the second jacket 22 of the fiber optic cable assembly 10 provides an added layer of protection to the optical fiber 14. This added layer of protection is potentially advantageous during installation of the fiber optic cable assembly 10. During installation of conventional cables, the outer jacket of the cable is grasped and used to pull an end of the cable to a desired location. At the location where the cable is grasped, the outer jacket of the cable is pinched. This pinching of the outer jacket may result in an optical fiber disposed within the jacket being pinched. In this situation, as the end of the cable is pulled to the desired location, the optical fiber may incur damage. The second jacket 22 of the fiber optic cable assembly 10 protects the optical fiber from being pinched by providing an additional layer of material. In another example, cables are often secured by a plurality of mounting structures such as staples. The second jacket 22 protects the optical fiber 14 from being crushed or damaged by the staples.

Figure 7:
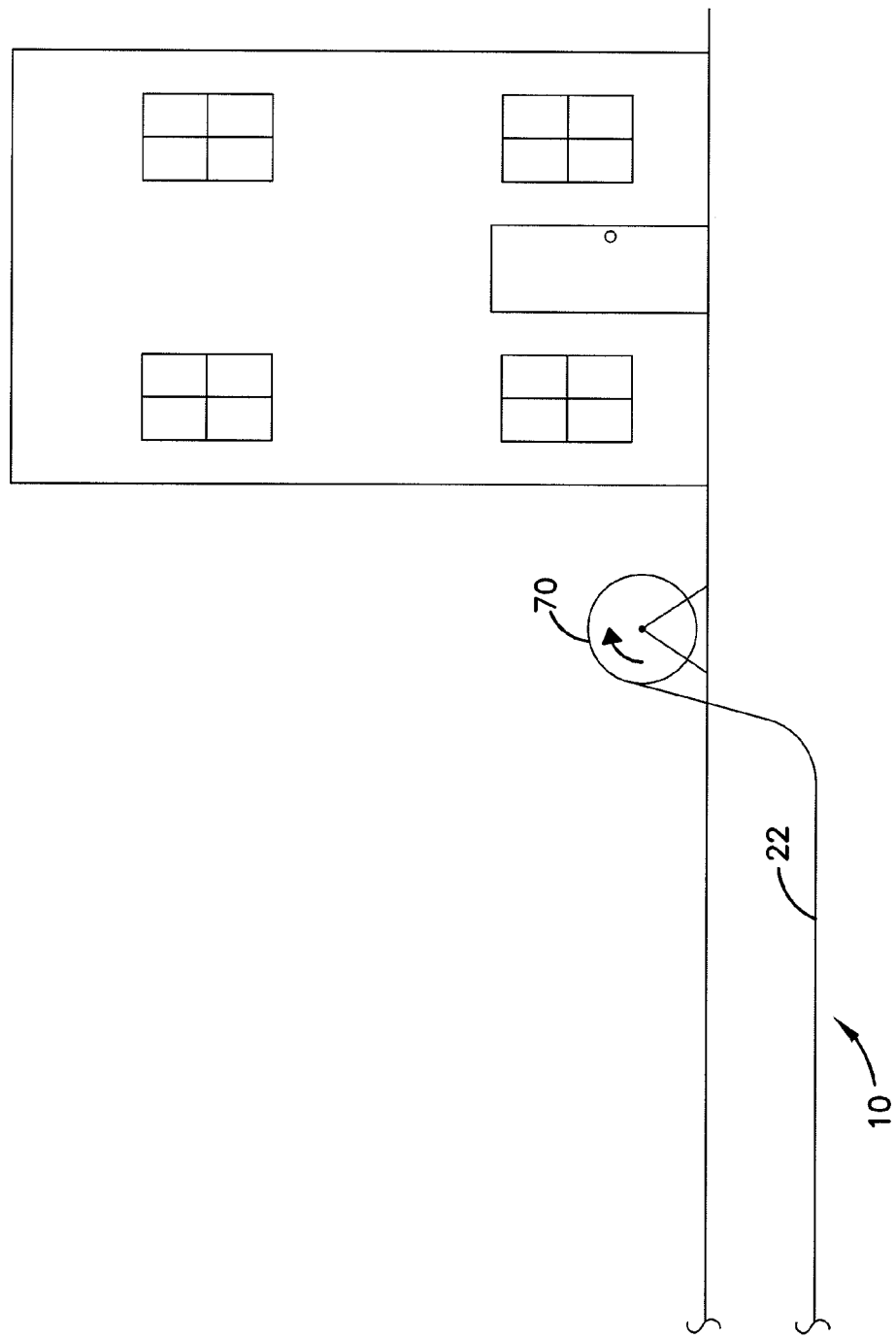
FIG. 7 is a schematic representation of a cable puller pulling the cable assembly of FIG. 1.

Referring now to FIG. 7, a simplified schematic representation of another exemplary use of the fiber optic cable assembly 10 is shown. In the depicted embodiment of FIG. 7, at least a portion of the fiber optic cable assembly 10 is disposed underground. In one embodiment, the fiber optic cable assembly 10 is directly buried underground. In another embodiment, the fiber optic cable assembly 10 is disposed in a conduit that is underground.

A cable puller 70 is connected to one end of the fiber optic cable assembly 10. With the second strength layer 34 anchored to the cable puller 70, the cable puller 70 pulls the fiber optic cable assembly 10 through the ground. As previously stated, the contra-helical orientation of the strength members 36 of the second strength layer 34 prevent the fiber optic cable assembly 10 from twisting as the cable puller 70 pulls the fiber optic cable assembly 10.

Figure 8:
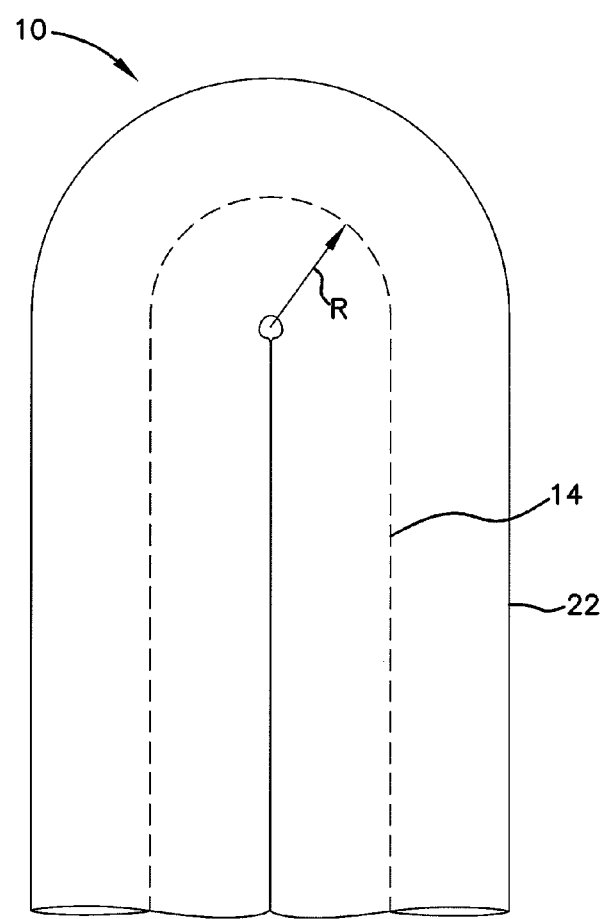
FIG. 8 is a perspective view of the fiber optic cable assembly of FIG. 3 in a bent orientation.

Referring now to FIG. 8, in one embodiment, the outer diameter of the second jacket 22 prevents or reduces the risk of damage from kinking of the fiber optic cable assembly 10. Kinking of the fiber optic cable assembly 10 occurs when the fiber optic cable assembly 10 is bent around about 180 degrees or more. If the radius of the second jacket 22 is larger than the minimum bend radius R of the optical fiber 14, the second jacket 22 prevents the optical fiber 14 from being bent beyond the minimum bend radius R of the optical fiber 14 if the fiber optic cable assembly 10 is kinked.

The fiber optic cable assembly 10 of the present disclosure is potentially advantageous because it provides a rugged second jacket 22 that can be selectively removed to expose a more compact inner cable assembly 12. In one embodiment, the second jacket 22 and the second strength layer 34 allow the fiber optic cable assembly 10 to be buried and pulled through the ground by a cable puller 70. In another embodiment, the second jacket 22 provides added protection to the optical fiber 14 of the inner cable assembly 12 for installation.

Figure 9:
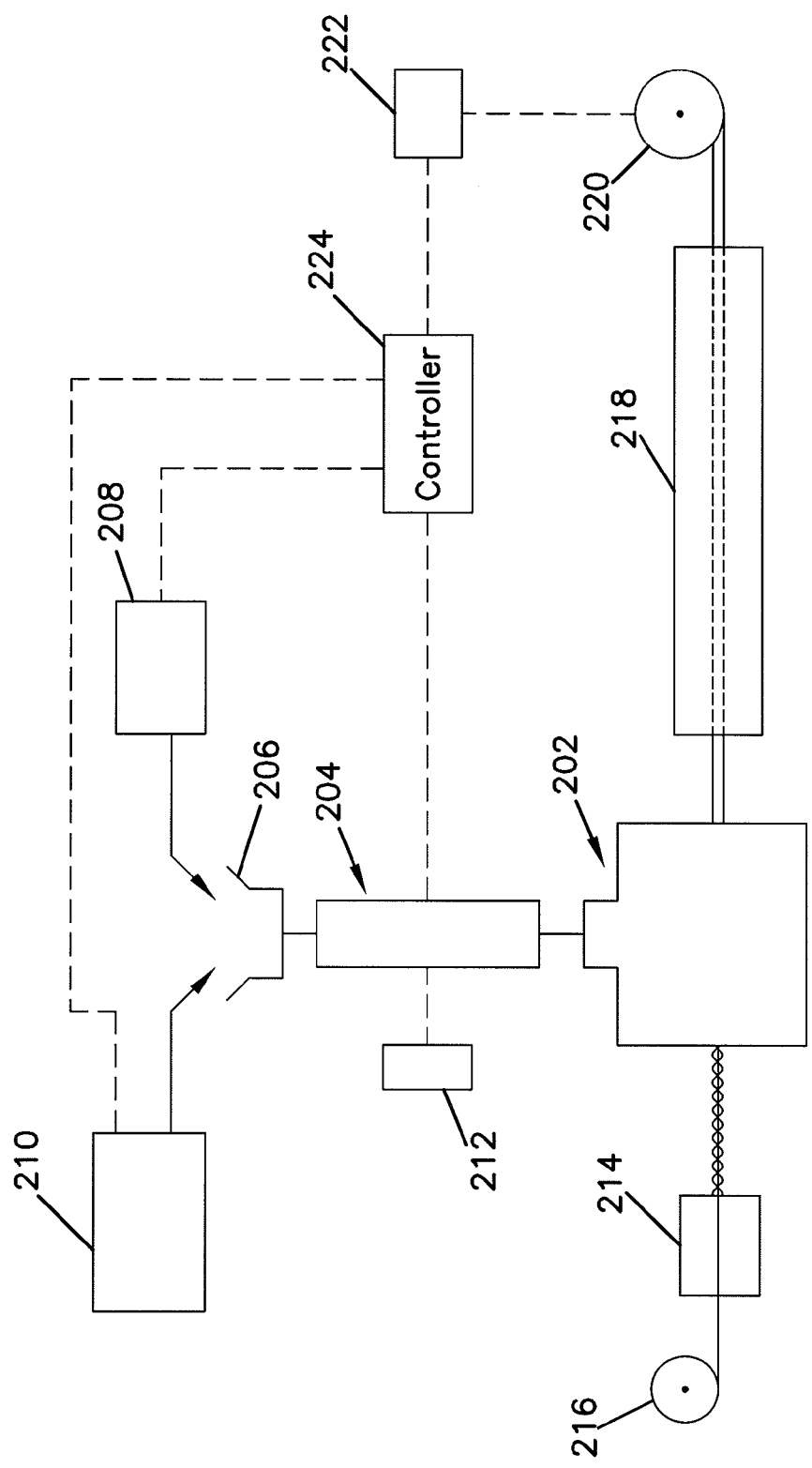
FIG. 9 is a schematic representation of a process suitable for manufacturing the cable assembly of FIG. 1.

Referring now to FIG. 9, a schematic representation of a system 200 for manufacturing the fiber optic cable assembly 10 will be described. The system 200 includes a crosshead, generally designated 202, that receives thermoplastic material from an extruder 204. A hopper 206 is used to feed materials into the extruder 204. A first conveyor 208 conveys the base material to the hopper 206. A second conveyor 210 conveys the shrinkage reduction material to the hopper 206. The extruder 204 is heated by a heating system 212 that may include one or more heating elements for heating zones of the extruder 204 as well as the crosshead 202 to desired processing temperatures.

The inner cable assembly 12 is fed into a torque balanced yarn server 214 from a feed roll 216. The torque balanced yarn server 214 contra-helically wraps the first and second sets of strength members 36a, 36b about the inner cable assembly 12. The inner cable assembly 12 with the second strength layer 34 surrounding the inner cable assembly 12 is fed into the crosshead 202.

A water trough 218 is located downstream from the crosshead 202 for cooling the extruded product that exits the crosshead 202. The cooled final product is stored on a take-up roll 220 rotated by a drive mechanism 222. A controller 224 coordinates the operation of the various components of the system 200.

Figure 10:
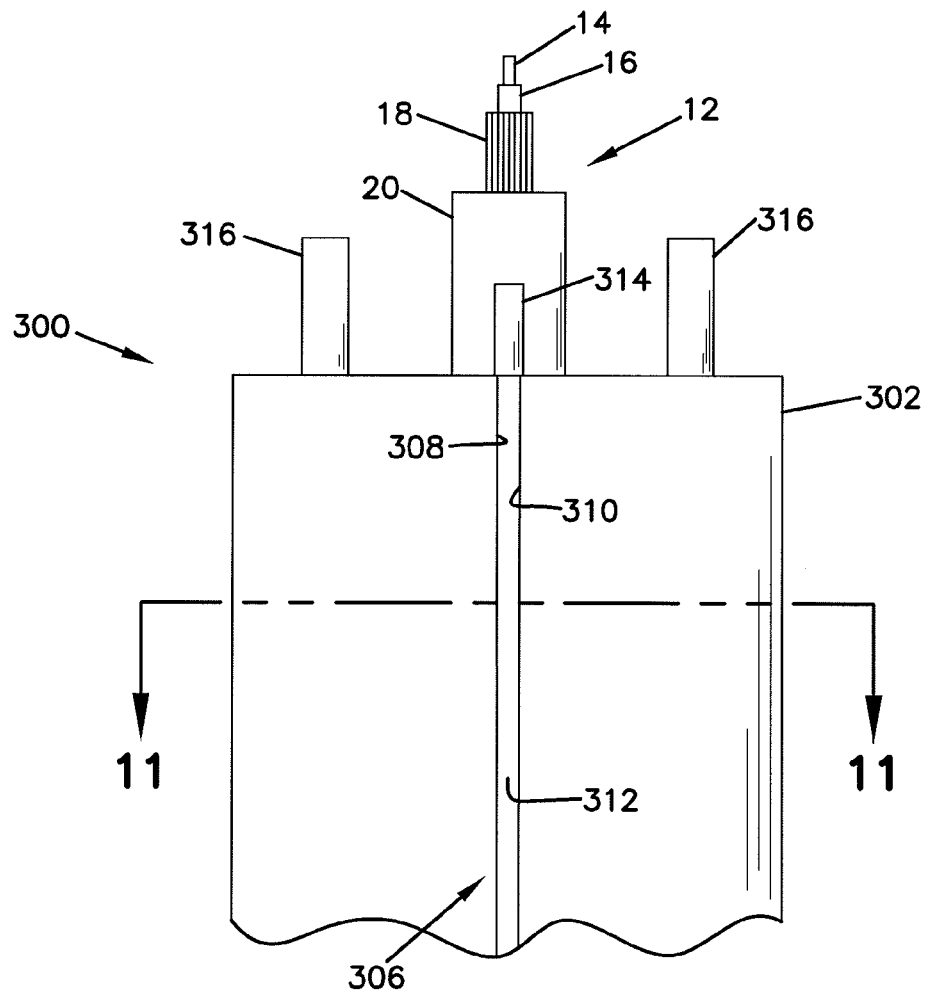
FIG. 10 is a front view of a fiber optic drop cable assembly having features that are examples of aspects in accordance with the principles of the present disclosure.
Figure 11:
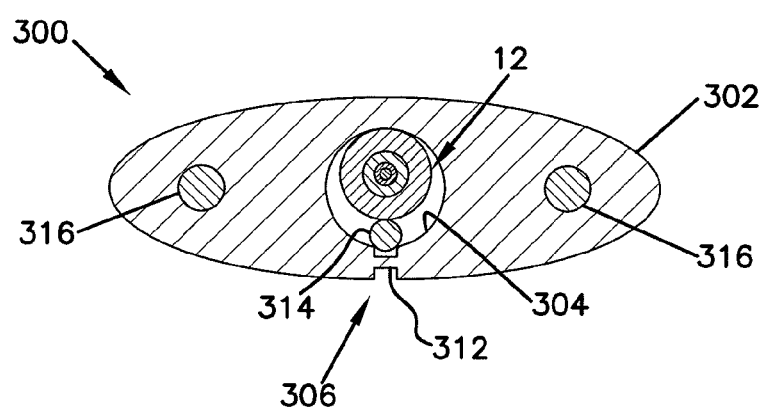
FIG. 11 is a cross-sectional view of the fiber optic drop cable assembly taken on line 11-11 of FIG. 10.

Referring now to FIGS. 10 and 11, a fiber optic drop cable assembly, generally designated 300, is shown. In the depicted embodiment, the fiber optic drop cable assembly 300 is a generally flat cable assembly. It will be understood, however, that the scope of the present disclosure is not limited to the fiber optic drop cable assembly 300 being a generally flat cable assembly.

The fiber optic drop cable assembly 300 includes the inner cable assembly 12. The inner cable assembly 12 includes the optical fiber 14, the buffer layer 16, the first strength layer 18, and the first jacket 20.

The fiber optic drop cable assembly 300 further includes a second jacket 302 disposed about the inner cable assembly 12. The second jacket 302 has a width W and a thickness T. In the subject embodiment, the width W of the second jacket 302 is greater than the thickness T. The greater width W than thickness T of the second jacket 302 gives the fiber optic drop cable assembly 300 its generally flat cable appearance.

In the subject embodiment, the second jacket 302 of the fiber optic drop cable assembly 300 is a generally flat includes a polymer material such as a flexible chain polymer. Example polymer materials suitable for use for the second jacket 302 include conventional thermoplastic polymers such as polyethylene, polypropylene, ethylene-propylene, copolymers, polystyrene, and styrene copolymers, polyvinyl chloride, polyimide (nylon), polyesters such as polyethylene terephthalate, polyetheretherketone, polyphenylene sulfide, polyetherimide, polybutylene terephthalate, low smoke zero halogens polyolefins and polycarbonate, as well as other thermoplastic materials. Additives may also be added to the material. Example additives include pigments, fillers, coupling agents, flame retardants, lubricants, plasticizers, ultraviolet stabilizers or other additives. The base material can also include combinations of the above materials as well as combinations of other materials. In one embodiment, the material of the second jacket 302 is the same as the material of the first jacket 20. In another embodiment, the material of the second jacket 302 is different than the material of the first jacket 20.

The second jacket 302 defines a cable opening 304 that extends the length of the fiber optic cable assembly 300. The cable opening 304 is sized to receive at least the inner cable assembly 12.

At least a portion of the second jacket 302 of the fiber optic drop cable assembly 300 can be selectively removed to expose the inner cable assembly 12. The second jacket 302 further defines a longitudinal split, generally designated 306. In one embodiment, the longitudinal split 306 extends the length of the fiber optic drop cable assembly 300. The longitudinal split 306 includes a first end 308 and an oppositely disposed second end 310.

In the subject embodiment, a web 312 connects the first and second ends 308, 310 of the longitudinal split 306. The web 312 acts as a line of weakness at which the second jacket 302 can be selectively opened. The web 312 is a thin strip of material having a thickness that is less than a thickness of the second jacket 302 between an outer surface of the second jacket 302 and the cable opening 304. In the subject embodiment, the web 312 is made of the same material as the second jacket 302.

In the subject embodiment, a ripcord 314 is disposed in the cable opening 304 between the first jacket 20 of the inner cable assembly 12 and the second jacket 302. The ripcord 314 extends the length of the fiber optic drop cable assembly 300. In the subject embodiment, the ripcord 314 is adapted to tear through the web 312 when subjected to a pulling force in a direction that is radially outward from the inner cable assembly 12. As the ripcord 314 is pulled, the first and second ends 308, 310 of the longitudinal split 306 separate, thereby providing a location at which the inner cable assembly 12 can be removed from the second jacket 302.

In one embodiment, the ripcord 314 is a polyester material. In another embodiment, the ripcord 314 is a nylon material. In another embodiment, the ripcord 314 is coated KEVLAR®.

Figure 12:
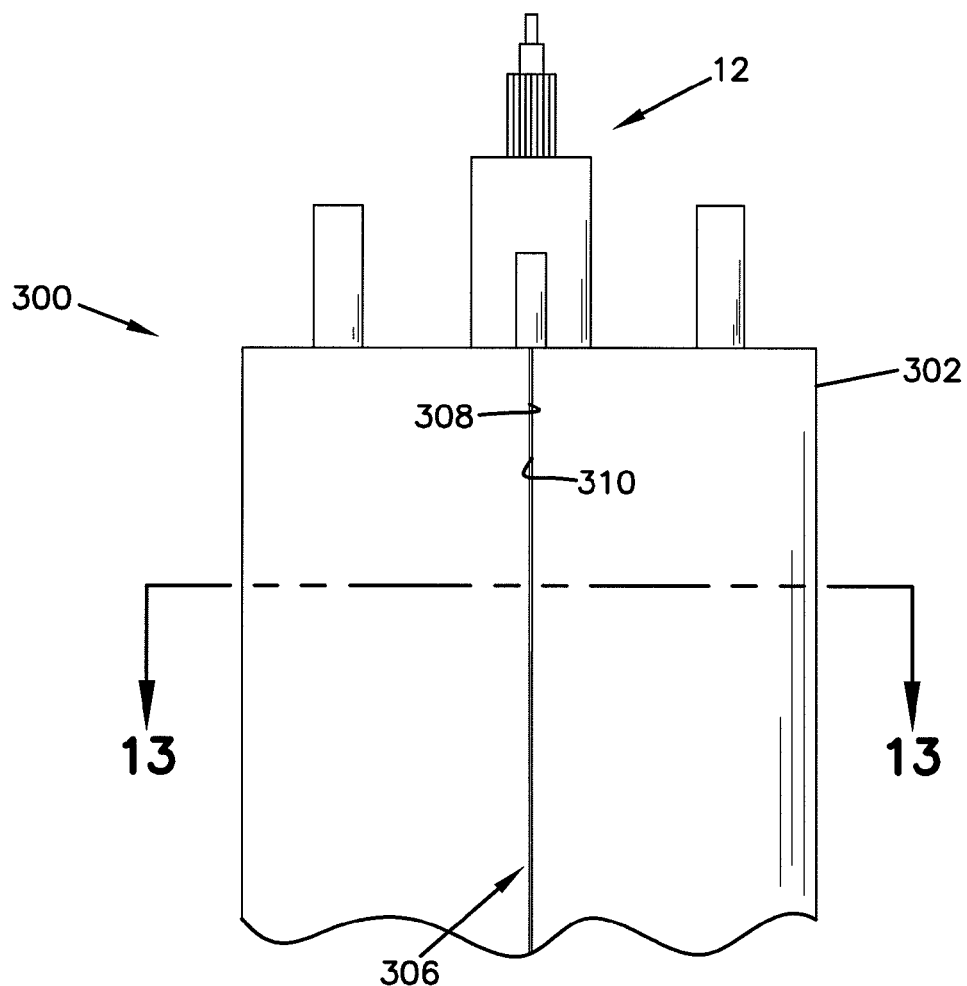
FIG. 12 is a front view of an alternate embodiment of the fiber optic drop cable assembly of FIG. 9.
Figure 13:
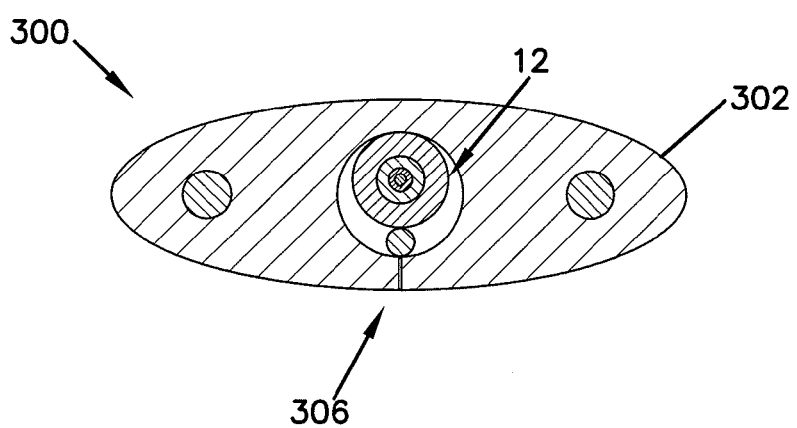
FIG. 13 is a cross-sectional view of the fiber optic drop cable assembly taken on line 13-13 of FIG. 12.

Referring now to FIGS. 12 and 13, an alternate embodiment of the longitudinal split 306 is shown. The longitudinal split 306 includes the first end 308 and the second end 310. In the subject embodiment, the first and second ends 308 and 310 are held closed by the inherent mechanical properties of the second jacket 302, which bias the second jacket 302 to a closed position. In another embodiment, the first and second ends 308, 310 can be held in the closed position by a thermal weld. In another embodiment, the first and second ends 308, 310 can be held in the closed position by an adhesive or a bonding agent disposed on at least one of the first and second ends 308, 310.

Referring again to FIGS. 10 and 11, the fiber optic drop cable assembly 300 further includes one or more reinforcing members 316. The reinforcing members 316 are adapted to inhibit axial tensile and/or compressive loading from being applied to the inner cable assembly 12. The reinforcing members 316 preferable extend the entire length of the fiber optic drop cable assembly 300. In the subject embodiment, and by way of example only, the reinforcing members 316 include reinforcing rods (e.g., a glass reinforced plastic rod having glass rovings in an epoxy base, a metal rod, a liquid crystal polymer rod, etc.) that extend lengthwise along the entire length of the fiber optic drop cable assembly 300.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fiber optic cable having a length that extends from a first end of the fiber optic cable to an opposite second end of the fiber optic cable, the fiber optic cable also including an intermediate location between the first and second ends of the fiber optic cable, the fiber optic cable comprising:
   an optical fiber that extends along the length of the fiber optic cable from the first end to the second end;
   a first jacket surrounding the optical fiber and a strength layer positioned between the optical fiber and the first jacket, the first jacket including a liquid crystal polymer within a base polymeric material; and
   an outer jacket and reinforcing arrangement including a second jacket defining an elongate transverse cross-sectional profile, the outer jacket and reinforcing arrangement also including a first strength member positioned outside the first jacket, the second jacket being removable from the first jacket such that the fiber optic cable forms a first cable portion that extends from the first end of the fiber optic cable to the intermediate location and a second cable portion that extends from the intermediate location to the second end of the fiber optic cable, the first cable portion being more rugged than the second cable portion.

2. The fiber optic cable of claim 1, wherein the outer jacket and reinforcing arrangement includes a second strength member positioned outside the first jacket opposite the first strength member.

* * * * *